United States Patent
R. et al.

(10) Patent No.: US 11,636,068 B2
(45) Date of Patent: Apr. 25, 2023

(54) DISTRIBUTED FILE LOCKING FOR A NETWORK FILE SHARE

(71) Applicant: Citrix Systems, Inc., Fort Lauderdale, FL (US)

(72) Inventors: Deepak R., Bengaluru (IN); Shailendra Shrivastav, Bengaluru (IN); Sangamesh Vishweshwar Kalagond, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 136 days.

(21) Appl. No.: 16/678,463

(22) Filed: Nov. 8, 2019

(65) Prior Publication Data

US 2020/0356534 A1 Nov. 12, 2020

Related U.S. Application Data

(60) Provisional application No. 62/845,518, filed on May 9, 2019.

(51) Int. Cl.
*G06F 16/176* (2019.01)
*G06F 16/182* (2019.01)
*G06F 16/27* (2019.01)
*G06F 16/215* (2019.01)

(52) U.S. Cl.
CPC ........ *G06F 16/1774* (2019.01); *G06F 16/176* (2019.01); *G06F 16/183* (2019.01); *G06F 16/215* (2019.01); *G06F 16/27* (2019.01)

(58) Field of Classification Search
CPC .... G06F 16/176; G06F 16/1774; G06F 9/526; G06F 16/27; G06F 16/215; G06F 16/183
USPC ................................ 707/704, 690, 692, 769
See application file for complete search history.

(56) References Cited

U.S. PATENT DOCUMENTS

| | | | | |
|---|---|---|---|---|
| 4,104,718 | A * | 8/1978 | Poublan | G06F 9/52 |
| | | | | 707/999.008 |
| 5,628,005 | A * | 5/1997 | Hurvig | G06F 12/0813 |
| | | | | 707/999.008 |
| 7,548,918 | B2 * | 6/2009 | Jain | G06F 16/1774 |
| | | | | 710/200 |
| 9,542,237 | B2 * | 1/2017 | Baron | G06F 9/526 |
| 9,813,491 | B2 * | 11/2017 | Glover | G06F 9/5083 |
| 9,990,372 | B2 * | 6/2018 | Lin | G06F 16/1774 |

(Continued)

FOREIGN PATENT DOCUMENTS

EP 3470984 A1 4/2019

OTHER PUBLICATIONS

Jul. 24, 2020—(WO) Intl. Search Report and Written Opinion—PCT/US2020/031584.

(Continued)

*Primary Examiner* — Shahid A Alam

(57) ABSTRACT

Methods and systems for file locking are described herein. An on-premise file share may store files that are accessible to both a local on-premise client and a remote off-premise client. The off-premise file share may request to check-out one of the files. In response, one of multiple nodes may obtain for the file a file handle with exclusive write access. File locking information may be stored at the file share that indicates the node that holds the file handle and that indicates the file is in a locked state whereby other remote off-premise clients or local on-premise clients are prevented from editing the file.

18 Claims, 12 Drawing Sheets

(56) References Cited

U.S. PATENT DOCUMENTS

| | | | |
|---|---|---|---|
| 2005/0289143 A1* | 12/2005 | Oshri | G06F 16/1774 707/999.008 |
| 2007/0101057 A1 | 5/2007 | Holt | |
| 2009/0027495 A1* | 1/2009 | Oskin | G08B 13/19682 348/143 |
| 2009/0112921 A1* | 4/2009 | Oliveira | G06F 16/178 707/999.103 |
| 2010/0250549 A1* | 9/2010 | Muller | G06F 16/27 707/769 |
| 2011/0055182 A1* | 3/2011 | Buban | G06F 16/11 707/704 |
| 2013/0275973 A1* | 10/2013 | Greenfield | G06F 9/45558 718/1 |
| 2014/0068127 A1 | 3/2014 | Baron et al. | |
| 2014/0143506 A1* | 5/2014 | Gole | G06F 9/526 711/143 |
| 2014/0365549 A1 | 12/2014 | Jenkins | |
| 2015/0120925 A1* | 4/2015 | Das | G06F 16/1774 709/225 |
| 2015/0134625 A1* | 5/2015 | Lentini | G06F 16/215 707/692 |
| 2016/0004718 A1* | 1/2016 | Lin | G06F 16/1774 707/690 |
| 2017/0286445 A1* | 10/2017 | Gowdappa | G06F 16/183 |

OTHER PUBLICATIONS

Choi, Choi, Lee, Youn, "Distributed Lock Manager for Distributed File System in Shared-Disk Environment," 2010 10th IEEE International Conference on Computer and Information Technology, Jun. 29, 2010, pp. 2706-2713, XP031757413.

* cited by examiner

DISTRIBUTED FILE LOCKING FOR A NETWORK FILE SHARE

CROSS REFERENCE TO RELATED APPLICATIONS

This application claims the benefit of U.S. Provisional Patent Application No. 62/845,518 entitled "File Sharing Systems and Methods" and filed on May 9, 2019, which is incorporated by reference herein in its entirety.

FIELD

Aspects described herein generally relate to computer networking, remote computer access, and hardware and software related thereto. More specifically, one or more aspects describe herein provide file locking for network file shares.

BACKGROUND

Network system architectures may provide multiple users shared access to files stored on a computing system. Local users may have direct access to shared files while remote users may have access to the shared files over a public network. System operators may wish to implement file locking mechanisms to ensure that users having direct local access to the shared files cannot edit them at the same time as users having remote network access.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

Computing networks, as described above, however, have practical limitations. In general, control of access to shared files is important in such networks. Without such control, changes or modifications to the file can be lost. The lost modifications increase re-work by the user and thereby diminish the user experience and collaborative nature of file sharing systems. Generally speaking, the challenge with network shares is that network access layers do not solely control access to files within the system. One way to maintain control of files is using check-in, check-out file management techniques. However, these techniques are not practical in some situations. For example, Common Internet File Systems (CIFS) do not provide check-in check-out file features for file management. File sharing protocols for such systems provide an open and cross platform mechanism for requesting network server files and services. CIFS protocols enable direct access to files by anyone with network access. Unlike typical file sharing computing networks, holding metadata alone is not enough to control access to the files for common internet file systems. Alternatively, users can hold a file handle with exclusive write access restricts all create, update, and delete CUD (-R, read) operations on the file and its parents. However, this approach is not practical using current technology because file handles cannot move across node boundaries and thus poses challenges in a distributive solution.

In addition, access permissions can also be a challenge in common internet file systems. For example, in some networks the access layer uses internet information services (IIS) based windows authentication to get user principal object and impersonated the user while providing access to the files. This ensures the file access rights are honored. Principal objects in CIFS, however, cannot move across node boundaries. Thus, the above authentication techniques are impractical for CIFS applications.

To overcome the above limitations, and to overcome other limitations that will be apparent upon reading and understanding the present specification, aspects described herein are directed towards file control and/or management of a network share using distributed access layer. A network share or shared resource may be a computer resource made available from one host to other hosts on a computer network. The distributed access layer may be a preexisting layer that adds other capabilities to network share and prevents write access to a checked-out file even through direct access by the user. To this end, the present solution describes example systems and methods to hold file handles with exclusive access permissions in a distributed access layer and give a unified view. Example systems and methods of the present disclosure may hold file handles with actual network user rights to solve authentication challenges when nodes that receive requests do not have the right file handles to respond to the requests. In these example systems there may be no single or master node that holds all the information. Rather, file lock information may be decentralized and persisted on the network share itself. In some examples, all nodes may access and update this information. This can be particularly useful in the event that one or more nodes go down and file handles are lost.

Aspects of these disclosures herein describe methods, devices, and systems that provide distributed file locking in a network file share. In some examples, an on-premise file share may store be accessible to both local on-premise clients as well as remote off-premise clients. The on-premise file share may store files that can be accessed and edited by both the local on-premise clients and the remote off-premise clients. Based on receiving a request for write access to one of the files from a remote off-premise client, one of multiple nodes may obtain a file handle with exclusive write access to the file. The on-premise file share may indicate that the file is in a locked state by storing file locking information that indicates which on-premise node holds the file handle. The file share may thus prevent the local on-premise clients from writing to the file while the file is in its locked state.

In other examples, the on-premise node that holds the file handle may be selected from among the multiple nodes based on one or more load balancing criteria. The file locking information may be stored in a lock file which is stored in the same directory as the file at the on-premise file share. Based on a receiving a request to save edits to the file, another on-premise node may be selected from among the multiple nodes to facilitate saving, to the on-premise file share, the edits to the file. This node may likewise be selected based on one or more load balancing criteria. The node selected to facilitate saving the edits to the file may be the same as or different than the node that holds the file handle. If a different node is selected, then the selected node may determine which node holds the file handle based on the file locking information stored at the on-premise file share. The selected node may then send the node that holds the file handle a request to release it. Having released the file handle, the edits to the file may be saved to the on-premise file share. If it is desirable to maintain the locked state of the file, then the selected node may acquire a new file handle for the file.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed to providing file locking for shared files that can be accessed directly by both local on-premise clients and remote off-premise clients. A network file share may store the shared files as well as file locking information indicating which shared files have been checked-out and are in a locked state such that they cannot be edited by other clients. To achieve the locked state and enforce file locking, a node holds the file handle of a checked-out file with exclusive access rights. In this way, a local on-premise client having direct access to a shared file cannot edit that shared file when it is checked-out for editing by a remote off-premise client. By holding the file handle using an on-premise node, an on-premise client is thus prevented from obtaining its own file handle for that file and is thus prevented from editing that file while the node holds the file handle on behalf of the off-premise client. A file share controller interfaces with the node to manage check-out and check-in requests. The node interfaces with the network file share to update the file locking information stored at the network file share. As a result, a network file share may advantageously ensure that local on-premise clients cannot edit a shared file at the same time as a remote off-premise client. The disclosures provided herein, therefore, yield improvements over file locking mechanisms that do not provide check-out capabilities for off-premise clients.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
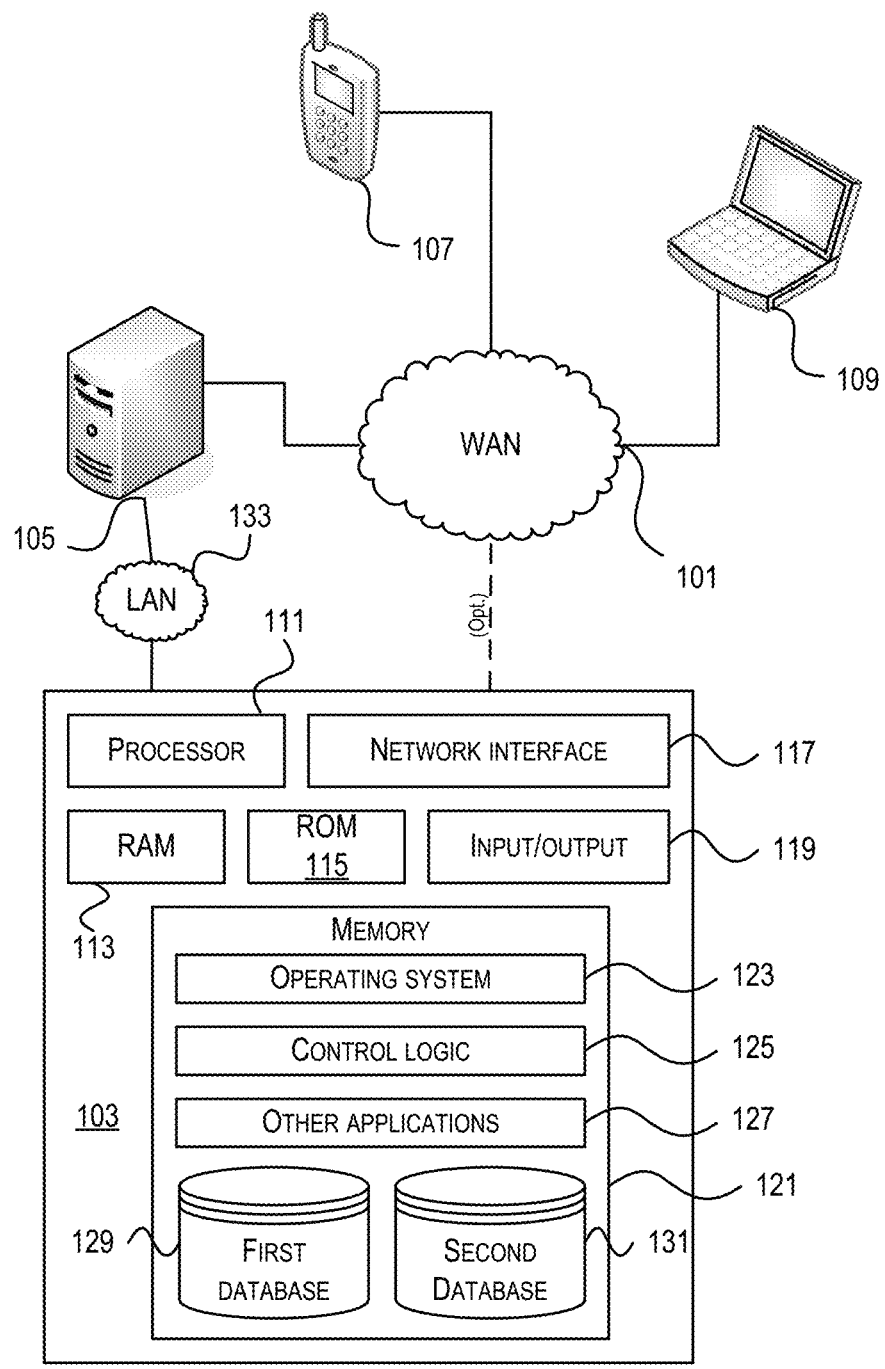
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
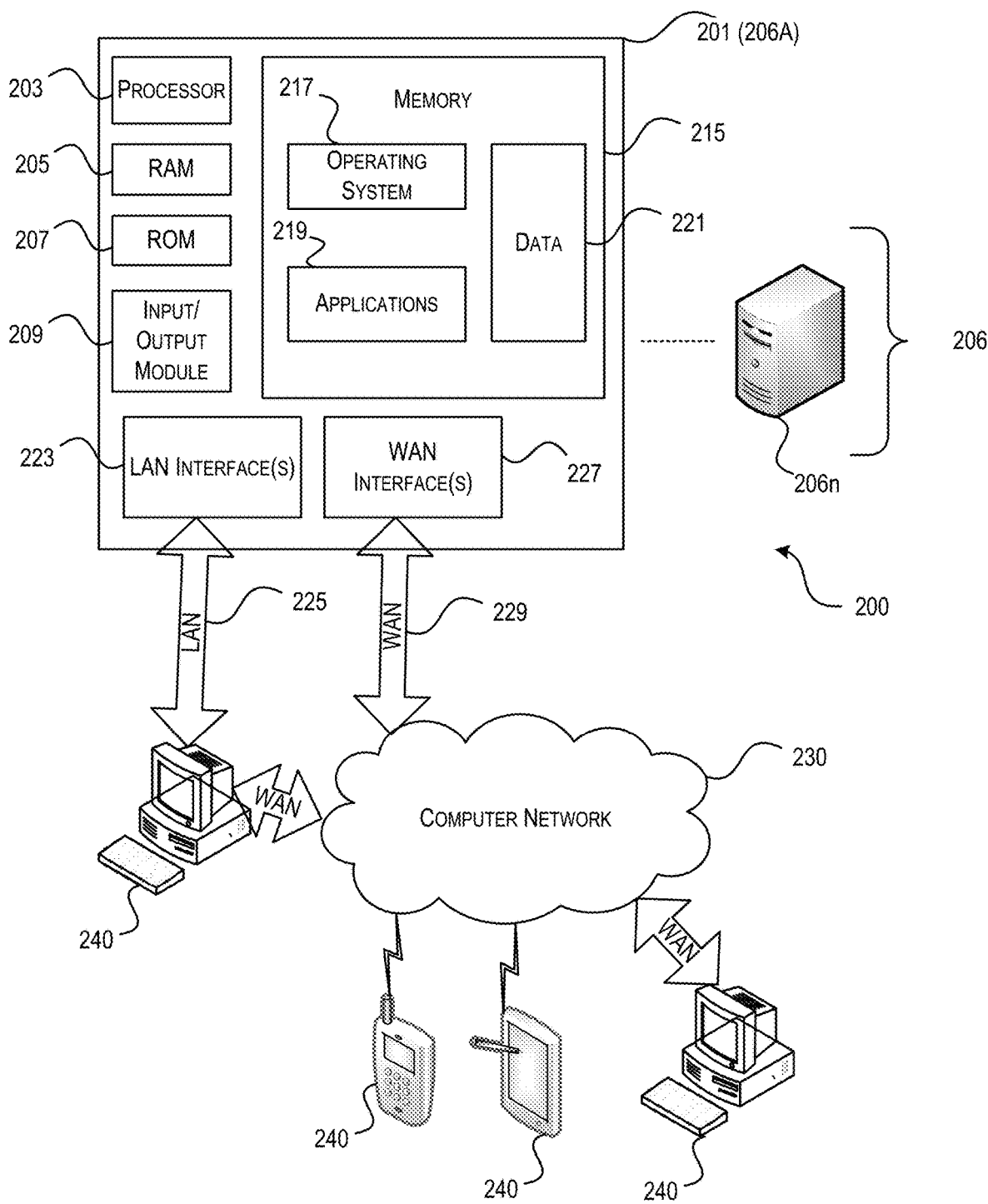
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206*a* in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
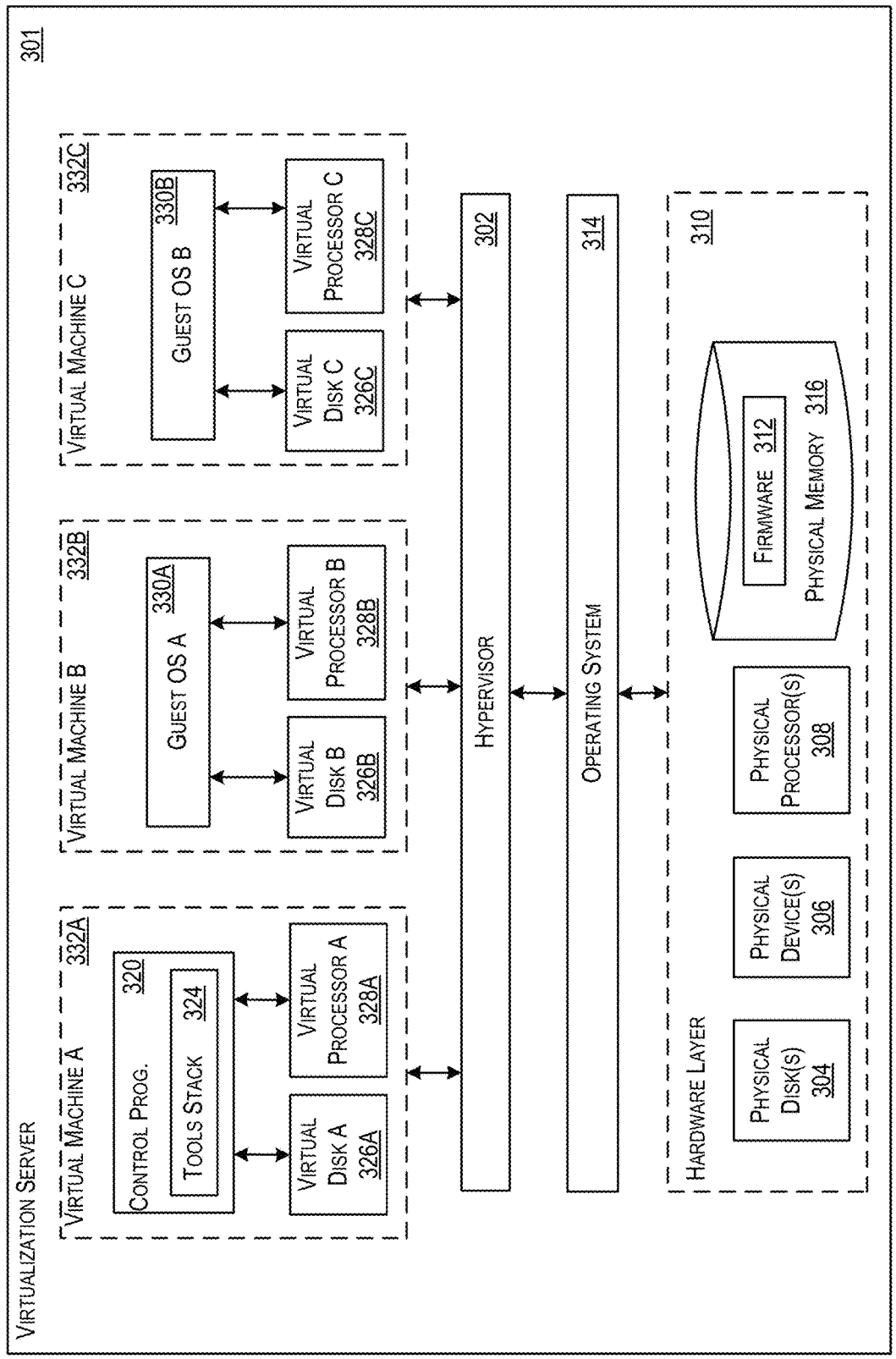
FIG. 3 depicts an illustrative virtualized system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
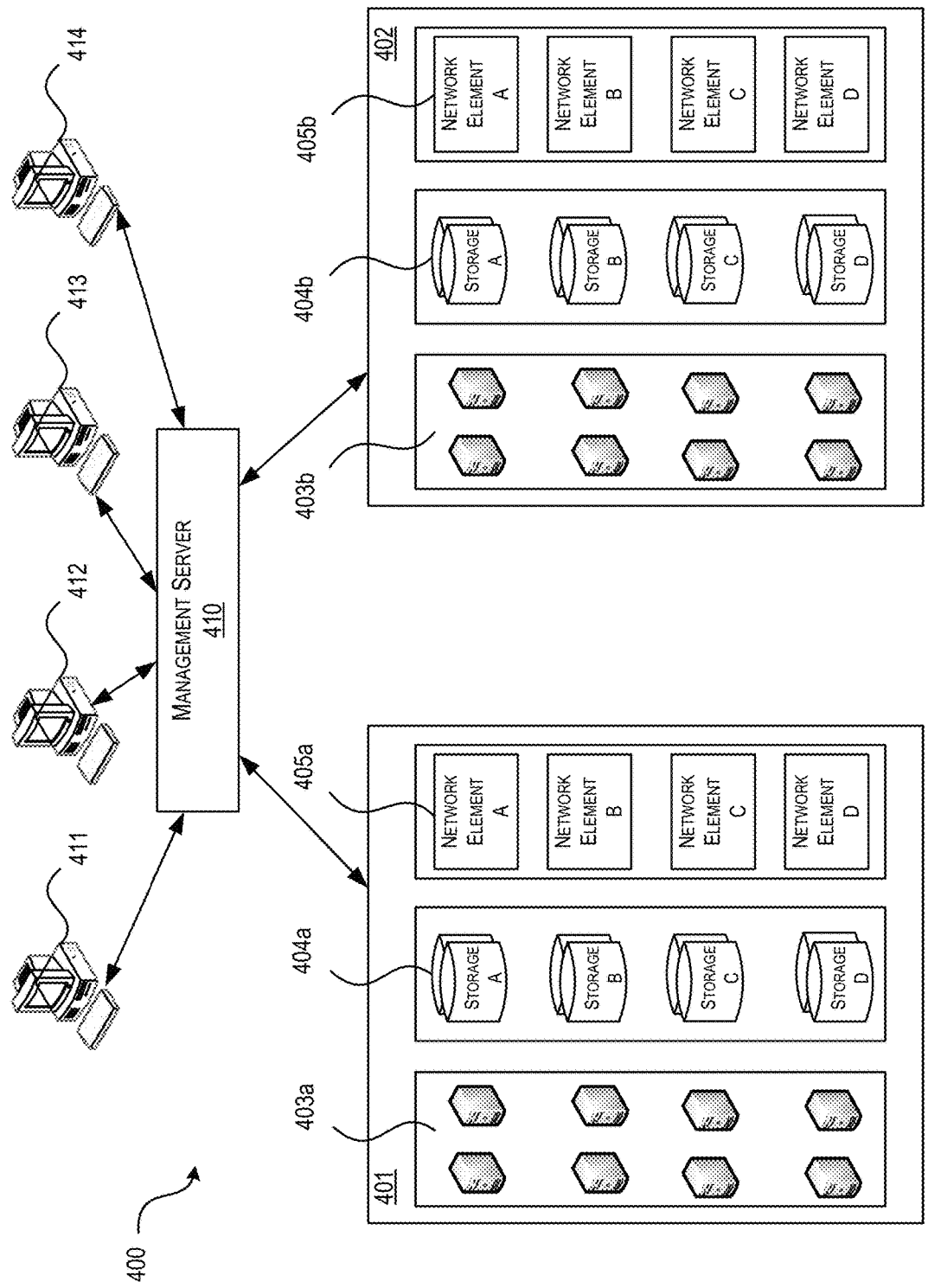
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, Citrix Cloud by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
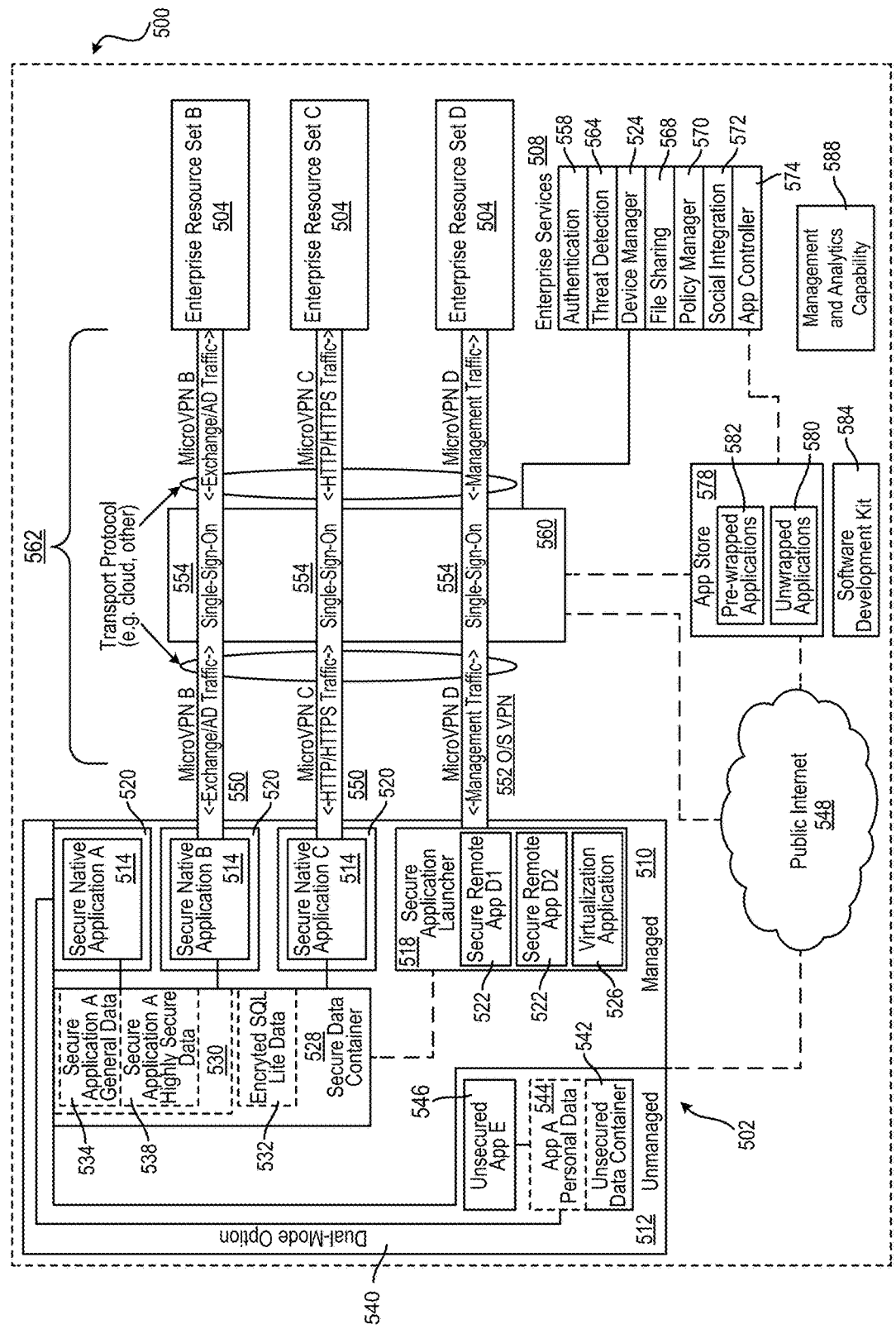
FIG. 5 depicts an illustrative enterprise mobility management system.

FIG. 5 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications (as illustrated by microVPNs 550, particular devices, particular secured areas on the mobile device (as illustrated by O/S VPN 552), and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway via a transport network 562. The transport network 562 may use one or more transport protocols and may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
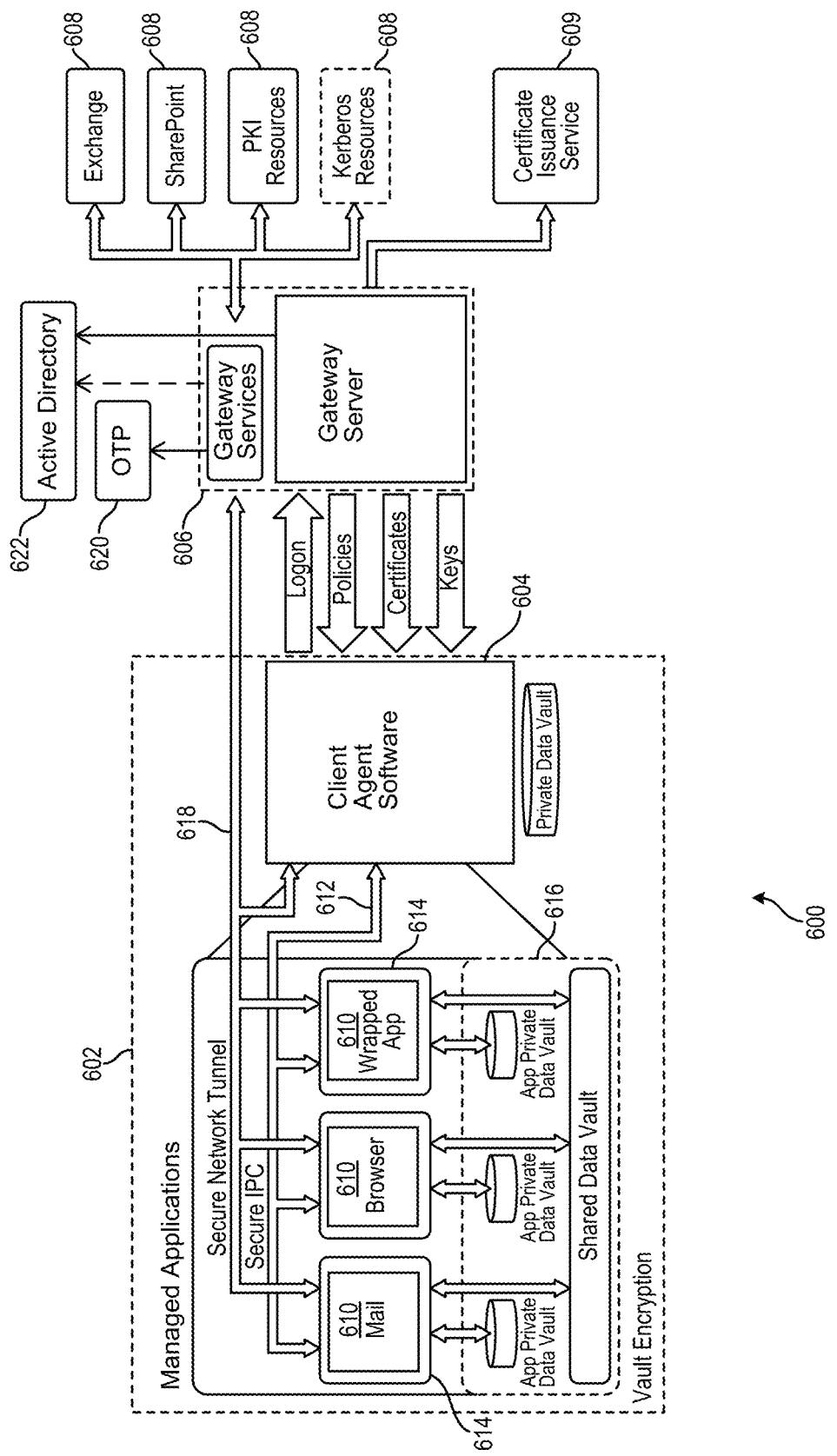
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PM) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the mobile device 602. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) 606 with SSO to other gateway server components. The client agent 604 obtains policies from gateway server 606 to control the behavior of the managed applications 610 on the mobile device 602.

The Secure InterProcess Communication (IPC) links 612 between the native applications 610 and client agent 604 represent a management channel, which may allow a client agent to supply policies to be enforced by the application management framework 614 "wrapping" each application. The IPC channel 612 may also allow client agent 604 to supply credential and authentication information that enables connectivity and SSO to enterprise resources 608. Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (for example, Citrix Gateway). Client agent 604 may also call supporting services on gateway server 606, which may produce input material to derive encryption keys for the local data vaults 616, or may provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. If or when data is stored locally on the mobile device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PM protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PM protected resources.

The client agent 604 and the application management framework 614 may be enhanced to support obtaining and using client certificates for authentication to internal PM protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL or TLS may also be implemented to provide additional security by requiring that a mobile device 602 is authenticated to the enterprise, and vice versa. Virtual smart cards for authentication to gateway server 606 may also be implemented.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Distributed File Locking for a Network File Share

Figure 7:
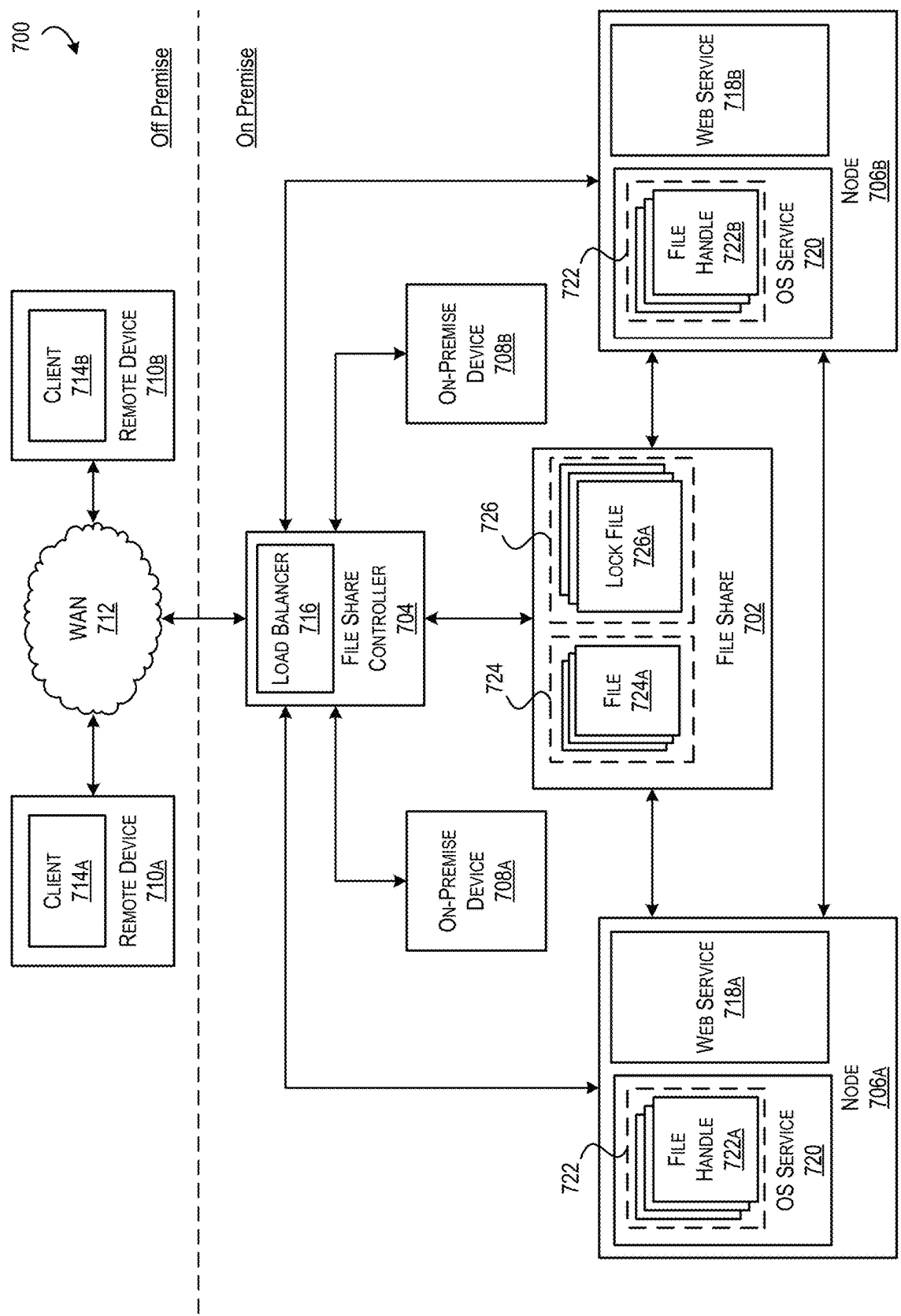
FIG. 7 depicts an illustrative distributed file locking system architecture that may be used in accordance with one or more illustrative aspects described herein.

FIG. 7 depicts an illustrative distributed file locking system architecture 700 that may be used in accordance with one or more illustrative aspects described herein. The distributed file locking system architecture 700, in this example, includes various on-premise and off-premise components. The on-premise components include a file share 702, a file share controller 704, multiple nodes 706A and 706B (generally node 706), and multiple on-premise devices 708A and 708B (generally on-premise device 708). The off-premise components include remote devices 710A and 710B (generally remote device 710). Although only two remote devices 710A-B and only two on-premise devices 708A-B are shown in FIG. 7, it should be appreciated that the distributed file locking system architecture 700 may include more or fewer remote devices 710 or on-premise devices 708. The off-premise components are in signal communication with the on-premise components via a wide area network (WAN) 712 which may include, for example, the public Internet. For the sake of convenience and without limitation, on-premise components include those that are logically located locally relative to each other, for example, via a direct signal connection or located within the same network domain and connected, e.g., over a local area network (LAN) connection. Components located within the same domain thus may be referred to as local components. Accordingly, components that are geographically remote from each other may nevertheless be logically local relative to each other if those components are within the same network domain. Off-premise components include those that are logically located remotely relative to the on-premise components such as over a WAN. Accordingly, off-premise components may be located within a network domain that is different than the network domain the on-premise are located within. Components located within a different network domain thus may be referred to as remote components. Accordingly, components that are geographically local to each other may nevertheless be logically remote relative to each other if those components are respectively within different network domains.

By way of example, on-premise components may include an enterprise's local computing resources such as its servers, appliances, data stores, databases, client machines (e.g., desktops, laptops), and the like. To continue this example, off-premise components may include terminals used to access the enterprise's computing resources from home such as mobile devices operated in a BOYD context as described above with reference to FIG. 5. To provide one specific example, a user operating a terminal from home may wish to edit a file stored in a data store at an employer's computer system. Another user may have direct access to the file from a terminal at the employer's office. The distributed file locking system architecture 700 described herein enables the first user to obtain exclusive access rights to the file for editing at the home terminal while preventing the second user from concurrently editing the file at the office terminal. In this example, the home terminal corresponds to the remote off-premise device 710, the employer data store corresponds to the on-premise file share 702, and the office terminal corresponds to the on-premise device 708. Accordingly, the on-premise devices 708 may thus correspond to, include, or otherwise be included in, for example, the network elements 405a-b in FIG. 4, the mobile device 502 in FIG. 5 (when local), or the mobile device 602 in FIG. 6 (when local). In a similar fashion, the remote devices 710A-B may correspond to, include, or otherwise be included in, for example, the remote computers 107 and 109 in FIG. 1, the terminals 240 in FIG. 2, the client computers 411-414 in FIG. 4, the mobile device 502 in FIG. 5 (when remote), or the mobile device 602 (when remote).

The remote off-premise devices 710A-B each include a respective client 714A or 714B (generally client 714) that manages access to the on-premise file share 702. Managing access to the file share 702 may include, for example, providing requests to "check-out" a file from the file share, providing requests to "check-in" the file to the file share, receiving notifications from the file share controller 704, and uploading edited files for storage at the file share. In some examples, a request to "check-out" a file may be a request for write access (e.g., exclusive write access) to the file. In other examples, a request to "check-out" a file may be a request for read-only access to the file in order to prevent edits during review of the file. The client 714 may be an application such as, for example, a desktop application or mobile application installed at the remote device 710 or a web application accessed using a web browser at the remote device. As noted above, the remote device 710 is in signal communication with the file share controller 704 via a WAN 712, e.g., the public Internet. The client 714 may be used to "check-out" a file for editing. Accordingly, a "check-out" request may include a request for write access to the file for editing. The checked-out file may be downloaded to the remote device 710 and edited by the user. The client 714 may thus also be used to "check-in" a file once editing is complete. Accordingly, the request to "check-in" a file may be a request to save the edits that have been made to the file. The edited file may be uploaded from the remote device 710 to the file share 702 for storage, e.g., as a replacement of the previous version of the file or as a separate new version of the file that exists at the file share contemporaneously with the previous version of the file. It should be appreciated, however, that a user might not actually edit a file after submitting a request for write access to the file and checking-out the file. The user may check-in the checked-out file without editing the file. It should also be appreciated that the local on-premise devices 708 may likewise include a client that manages access to the on-premise file share 702 which may be the same as or similar to the client 714 at the remote off-premise device 710.

As used herein and without limitation, to "check-out" a file includes obtaining exclusive rights to edit the file. When a file is "checked-out," only the user possessing the exclusive editing rights (e.g., exclusive write access) may be permitted to edit the file. Exclusive editing rights may include the right to change the contents of the file, change the name of the file, change the type of file (e.g., change the file extension), move the file (e.g., to a new storage location), delete the file, change permissions or security features associated with the file, and change other content or characteristics associated with the file. Because a "checked-out" file may be edited by only the user possessing the exclusive editing rights for it, the "checked-out" file may be described as "locked" from editing by other users. Accordingly, a "checked-out" file may also be described as a "locked" file that is in a "locked" state, and the process of "checking-out" a file may similarly be described as "locking" the file. Even though one user may possess exclusive rights to edit a "checked-out" file, it should be appreciated that other users may nevertheless possess non-exclusive rights to read the "checked-out" file. Also used herein and without limitation, to "check-in" a file includes surrendering exclusive editing rights such that the file is available for another user to "check-out" and edit the file. It should be appreciated that, in some circumstances, another user such as an administrator having certain rights and privileges may be permitted to edit a file that is "checked-out" to another user and/or may be permitted to "check-in" a file on behalf of another user, e.g., to facilitate troubleshooting. It should also be appreciated that the exclusive rights may extend beyond editing the checked-out file. For example, the exclusive rights may include the exclusive right to delete a checked-out file, the exclusive right to move a checked-out file (e.g., to a different file share directory), or the exclusive right to rename a checked-out file. In addition, a user may be prevented from modifying, deleting, or renaming any directory in the file path of a checked-out file while the file is checked-out.

The file share controller 704 manages the check-out requests, check-in requests, and upload requests received from the remote devices 710. As described in further detail below, file locking is provided in the distributed file locking system architecture 700 using multiple on-premise addressable nodes 706. The nodes 706 may be associated with an address (e.g., an IP address) within the local network domain. In this way, the file share controller 704 may route check-out requests and check-in requests to a selected node using the address associated with the node. As described in further detail below, the nodes 706 may be able to exchange communications with each other using the respective addresses associated with the nodes. The file handles of the checked-out files are distributed across the on-premise nodes 706, and each file handle held by an on-premise node corresponds to one checked-out file. To manage the load on the on-premise nodes 706, the file share controller 704, in this example, includes a load balancer 716. The load balancer 716 selects, based on one or more load balancing criteria, which node 706 to route a check-out request, check-in request, or upload request received from a remote device 710. As also described in further detail below, in some implementations, check-in requests and/or upload requests may be routed to a node 706 even if that node does not hold the file handle of the file to check-in. Routing check-in requests and/or upload requests to any of the nodes 706 distributes the workload of determining where the file handle resides which advantageously minimizes the chance of the file share controller 704 becoming a bottleneck for incoming check-in requests and/or upload requests. In other implementations, however, the node 706 holding the file handle of the file to check-in and/or upload may be determined at the file share controller 704, and the load balancer 716 may route the check-in request and/or upload request to that node. The file share controller 704 may correspond to, include, or otherwise be included in, for example, web server 105 of FIG. 1, server 206a in FIG. 2, server 301 in FIG. 3, or management server 410 in FIG. 4.

As noted above, the nodes 706 hold the file handles of the "checked-out" files in order to lock the files and enforce file locking. A file handle can be, for example, a temporary reference (e.g., a number) assigned by an operating system to a file that an application has requested to open. The nodes 706, in this example, include a web service 718. The web service 718 processes check-out requests and check-in requests routed to it from the file share controller 704. The web service 718 communicates with an operating system (OS) service 720 to obtain and release the respective file handles 722 for the corresponding files 724 to check-out or check-in. As described in further detail below, processing check-out requests includes obtaining the file handle 722A for the file 724A to check-out with exclusive rights to edit the file, indicating the owner of the file handle that is permitted to exclusively edit the file, and updating the information used to indicate whether files at the file share 702 have been checked-out and are thus locked. As also described in further detail below, processing check-in requests includes releasing the file handle 722A for the file 724A to check-in, facilitating the storage of the edited file at the file share 702, and again updating the information used to indicate whether files at the file share have been checked-out. According to one example aspect of the present disclosures, a file handle does not cross node boundaries. In other words, in an example implementation, a file handle is held by the node that acquired it until it is released. The nodes 706 are thus in signal communication with the file share 702. Although only two nodes 706 are shown in FIG. 7, it should be appreciated that the distributed file locking system architecture 700 may include additional nodes 706. A node 706 may be a physical machine, and multiple nodes may be implemented using multiple physical machines. Additionally or alternatively, a node 706 may be a virtual machine, and multiple nodes may be implemented using multiple virtual machines that execute on one or more physical machines. Accordingly, the nodes 706 may correspond to, include, or otherwise be included in, for example, the servers 206a-n in FIG. 2, the server 301 or the virtual machines 332A-C in FIG. 3, or servers 403a-b or network elements 405a-b in FIG. 4.

As noted above, the load balancer 716 of the file share controller 704 may route check-out and check-in requests received from a remote device 710 to any of the nodes 706, e.g., node 706A or node 706B. This may result in a situation whereby a check-in request is routed to a node (e.g., node 706B) that does not hold the file handle (e.g., file handle 722A held by node 706A) for the file 724A that is to be checked-in. Accordingly, the nodes 706A-B also may be in signal communication with each other in order to locate the node that does hold the corresponding file handle. In some implementations, the nodes 706 may communicate with each other using HyperText Transfer Protocol (HTTP) requests. Any suitable communication protocol may be employed, however, that enables the nodes 706 to communicate. Other examples of suitable communication protocols include TCP (Transmission Control Protocol), named pipes, and the like. As described in further detail below, one node 706 may communicate with another to, for example, request the other node release a file handle it holds, indicate that a file handle has been released, request the other node update the information indicating which file handles it currently holds, and the like. The load balancer 716 may likewise communicate with the nodes 706 (e.g., to route check-out and check-in requests) using the any suitable communication protocol such as those identified herein.

The file share 702, in this example, stores the files 724 and the file locking data 726. The file share 702 (and, in turn the files 724 it stores) may be accessible to both the local on-premise devices 708 as well as the remote off-premise devices 710. The accessibility of the file share 702 may be governed by a security layer between the local on-premise devices 708 and the remote off-premise devices 710, e.g., using appropriate authentication and authorization mechanisms. The files 724 may include any type of file in any type of format. Example types of the files 724 that may be stored at the file share 702 include such as text files, document files, image files, video files, audiovisual files, presentation files, spreadsheet files, binary files, archive files, computer-aided design files, database files, publishing files, font files, graphics files, source code files, object code files, executable files, library files, page description files, data files, automation files, script files, security-related files (e.g., certificates, keys), game-related files, partial files, temporary files, and the like. In some example implementations, the files 724 may be stored in the file share 702 using a directory (folder) structure that uses directories and subdirectories to store the files. In some example implementations, the file locking data 726 may be stored at the file share 702 as individual lock files 726A. For example, the file share 702 may include a file share directory that stores multiple lock files 726A, one each for the nodes 706 that the file share is in signal communication with, in other words, one lock file 726A per node 706. The file share directory (folder) that stores the lock files 726A may be a hidden directory (hidden folder). The file locking data 726 may indicate, for example, the name of the checked-out file (e.g., the file's filename), the corresponding file handle of the checked-out file that is held by a node 706, an address (e.g., IP address) of the node that holds the file handle, the user that has checked-out the file, when the file was locked (e.g., when the file was checked-out), and when the lock expires. The file locking data 726 may also indicate when it was last modified (e.g., using a timestamp). Updating the file locking data 726 (e.g., when checking-in or checking-out a file) may thus include updating a last modified timestamp. The file share may thus correspond to, include, or otherwise be included in, for example, the data server 103 in FIG. 1, servers 206a-n in FIG. 2, or storage resources 404a-b in FIG. 4.

For convenience, the user that has checked-out the file that is locked from editing by other users may be referred to as the "owner" of the lock. A timestamp may be used to indicate when the file was locked and when the lock expires. Where a lock expiration is employed, a checked-out file may automatically be checked-in upon expiration of the lock. Additionally or alternatively, the owner of the lock may be notified that the lock has expired requesting that the owner check-in the file and/or that the file will be automatically checked-in if the owner does not check-in the file by a specified date and/or time. A lock file 726A may be a plaintext file or a binary file. As described in further detail below, the file locking data 726 (e.g., a lock file 726A) may be updated whenever a file 724A is checked-out and checked-in. Updating the file locking data 726 may include modifying or deleting some or all of the information noted above, e.g., to indicate that a checked-out file has been checked-in and is no longer locked from editing by other users, to indicate that a checked-in file has been checked-out by a different user, to indicate that the lock expiration has been reset, to refresh the information indicating which file handles are held by which nodes, and the like. A user account with sufficient access rights (e.g., an administrator account) may be used to create and update the lock file(s) for the node(s).

Alternative approaches to storing the file locking data 726 at the file share 702 may be employed. For example, the file share may store a single lock file that includes the file locking data for all (or multiple) nodes 706 that the file share 702 is in signal communication with. As another example, each directory of the file share 702 may store its own lock file that identifies the node(s) holding the file handle(s) for the file(s) stored in that directory. Furthermore, the file share 702 may employ alternative types of file systems other than a directory-based file system, e.g., flat file systems, database file systems, and the like. It should also be appreciated that the file locking data 726 may also be stored at a location other than the file share 702 in some example implementations. Moreover, although only one file share 702 and one file share controller 704 are shown in FIG. 7, multiple on-premise file shares and multiple file share controllers may exist in example implementations of the distributed file locking system architecture described herein.

FIGS. 8-12 illustrate, in flowchart form, various algorithms that may be executed to perform the processes described herein. Although the algorithms are shown to have and are described as having various steps, particular implementations of the disclosures described herein may include processes having one or more of the steps described, processes that include additional or alternative steps, processes in which one or more of the steps are omitted, and/or processes in which one or more of the steps are performed in a different order than the order shown and described by way of example herein. It will be appreciated that the algorithms illustrated by way of example using the flowcharts shown in FIGS. 8-12 may be performed by a single device or by multiple devices acting in conjunction with each other.

Figure 8:
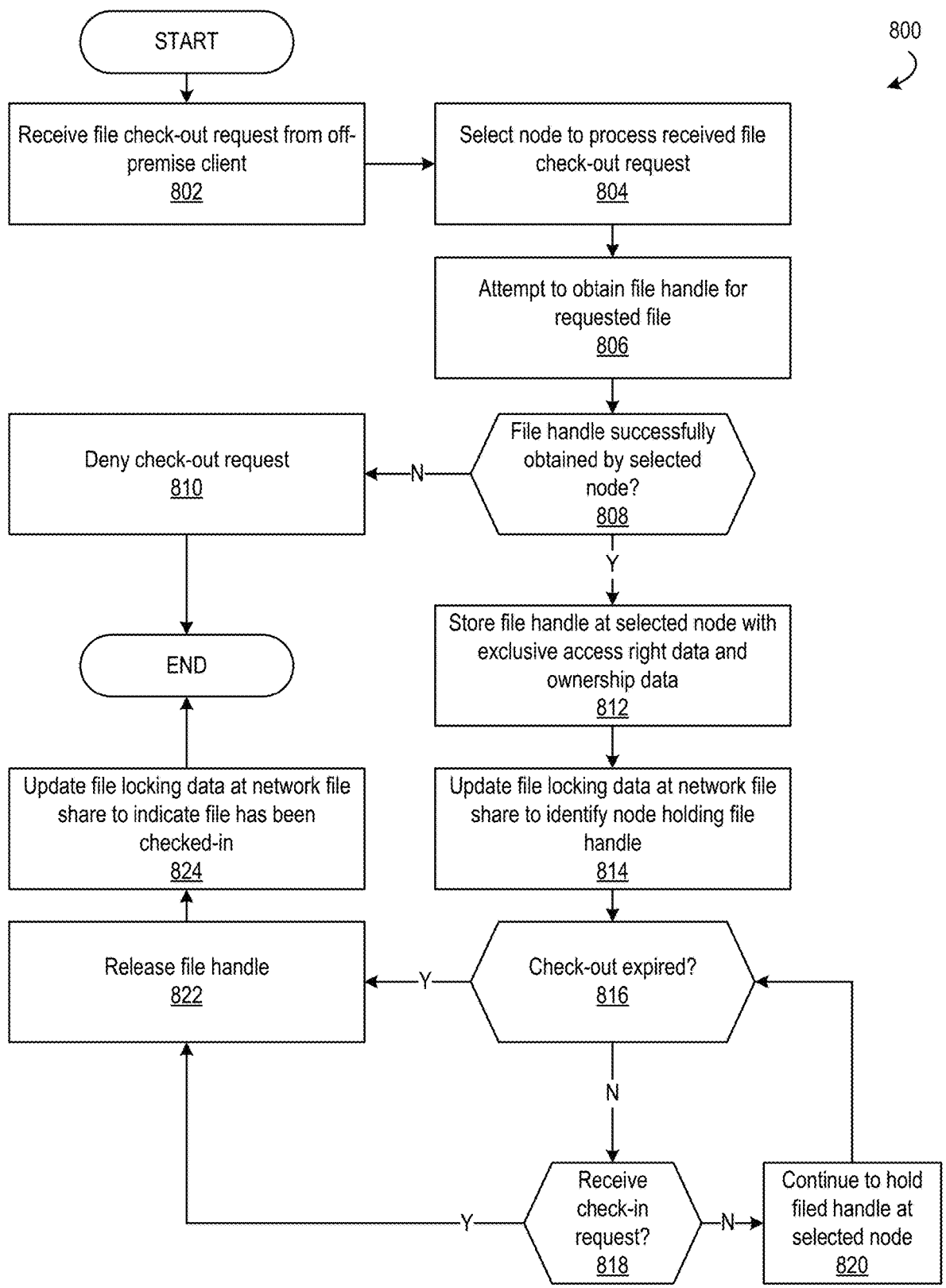
FIG. 8 depicts an illustrative flowchart of example steps for file check-out in a distributed file locking system in accordance with one or more illustrative aspects described herein.

Referring now to FIG. 8, a flowchart 800 of example method steps for checking-out a file using a distributed file locking architecture as described herein are shown. The steps shown in FIG. 8 are intended to give a general overview of an example check-out and check-in process. Accordingly, specific implementations of a check-out and check-in process may include additional steps that are not shown in FIG. 8. Checking-out a file may begin with receiving, from an off-premise source, a file check-out request (step 802). An on-premise file share controller (e.g., file share controller 704 in FIG. 7) may receive the file check-out request. The off-premise source may be a remote device (e.g., remote device 710 in FIG. 7). Having received the file check-out request, a node may be selected to process the received file check-out request (step 804). The node (e.g., node 706 in FIG. 7) may be selected by a load balancer (e.g., load balancer 716 in FIG. 7) of the file share controller. The load balancer may employ criteria to provide a substantially even distribution of file check-out requests across the set of nodes and to avoid bottlenecks with respect to completing check-out requests. Such criteria may include the total number of check-out requests routed to the respective nodes within a threshold time period, the respective number of file handles currently held by the individual nodes, and the like. The selected node may receive the check-out request from the share file controller via a web service (e.g., web service 718 in FIG. 7) at the selected node.

Having selected a node to process the received file check-out request, the selected node may attempt to obtain a file handle for the requested file (step 806). The selected node may utilize an OS service (e.g., OS service 720 in FIG. 7) to obtain a file handle for the requested file. If the selected node cannot successfully obtain a file handle for the requested file (step 808:N), then the check-out request may be denied (step 808) and the check-out process may end. Denying a check-out request may include notifying the off-premise client that requested file cannot be checked-out. A selected node may be unable to obtain a file handle for the requested file if, for example, the requested file is already checked-out and a node (e.g., the same node or a different node) already holds a file handle for the requested file. In some example implementations, before the check-out request is denied, the selected node may determine whether the file handle for the requested file has expired, e.g., by evaluating the file locking data stored for the file at the network file share. If the file handle has not yet expired, then the check-out request may be denied as described above. If the file handle has expired, however, then the selected node may either release it (if it is the node that holds the expired file handle) or send a request to release the expired file handle to the node that holds it. Once the expired file handle has been released, the selected node may obtain a new file handle for the requested file and the check-out process may continue as described below.

If, however, the selected node can obtain a file handle for the requested file (step 808:Y), then the selected node may store that file handle (e.g., file handle 722A in FIG. 7) along with data indicating the user that has checked-out the file (the "owner" of the lock) and data indicating the exclusive access rights granted to that user in order to exclusively edit the file (step 812). The file locking data (e.g., file locking data 726 in FIG. 7) stored at the file share (e.g., file share 702 in FIG. 7) may also be updated to reflect that the requested file has been checked-out and that the selected node holds the file handle of the checked-out file (step 814). The node selected to handle the check-out request may perform the update of the file locking data, e.g., by updating the lock file (e.g., lock file 726A in FIG. 7) corresponding to the selected node. The file locking data may be updated to indicate, e.g., the name of the checked-out file, the file handle held by the selected node, the date and/or time the file was checked-out, a date/time the check-out expires, and the like. The node may likewise utilize its web service to carry out the updates of the file locking data at the file share.

Employing an expiration period for the check-out may be optional. In example implementations that do employ a check-out expiration period, the selected node may monitor the expiration period(s) for the file handle(s) it holds. If the check-out period has not yet expired (step 816:N) and a check-in request has not been received (818:N), then the selected node may continue to hold the file handle (step 820). If, however, the check-out period has expired (step 816:Y) or if a check-in request is received (step 818:Y), then the selected node may check-in the checked-out file. It should be appreciated that, in specific implementations, check-out expiration may occur asynchronously based, e.g., on the expiration period set in a particular implementation. Example steps for checking-in a checked-out file are described in further detail below with references to FIGS. 9-11. Briefly, however, checking-in a checked-out file may include releasing the file handle (step 822) and updating the file locking data stored at the file share to reflect that the requested file has been checked-in (step 824). Updating the file locking data to indicate a file has been checked-in may include, for example, modifying the lock file stored at the file share that corresponds to the node that held the file handle, e.g., by deleting from the lock file the information indicating the file and its associated file handle. Similar to check-out expiration, check-in may also occur asynchronously, e.g., based on receipt of a check-in request from the user that checked-out the file.

In order to acquire a file handle on behalf of a user, a node may use the user's access credentials for authentication and authorization. For example, the files stored in the file share may be associated with respective file access rights that define which user(s), user group(s), and/or user type(s) are permitted to access those files. The distributed file locking system described herein may be configured to enforce those file access rights when an off-premise device seeks access to the file(s) in the file share. To enforce file access rights, the distributed file locking system may obtain the user principal object for the user requesting access to a file stored at the file share and use that user principal object to impersonate the user when providing access to the files. By impersonating the user using the user's user principal object, file access rights may be enforced.

A user principal object may be created when the user first logs in and requests access to a file stored at the file share (e.g., submits a check-out request). The user principal object may thus correspond to the remote access credentials used to remotely access the file share from an off-premise device. A user may also be associated with local access credentials provided by a domain controller that define file access permissions for the user, the user's user group(s), and/or the user's user type. Accordingly, the distributed file locking system may map the user's remote access credentials to the user's local access credentials in order to provide access to the files stored at the file share and enforce any file access rights associated with the user and/or the shared files. The nodes of the distributed file locking system may respectively store (e.g., in a cookie, in a cache, etc.) users' local access credentials in order to facilitate check-in, check-out, and upload requests respectively assigned to the nodes. For example, a node may be selected to process a check-out request received from a user of a remote off-premise device. The node may store the local access credentials associated with that user in order to access the requested file at the file share. If a node does not have the user's local access credentials stored, then the user may be prompted to provide the local access credentials needed to access the requested file (e.g., may be prompted to log in). In some example implementations, the local access credentials may not cross node boundaries. In other words, in these example implementations, a node may not pass any local access credentials it stores to another node. Accordingly, in some example implementations, users may be prompted to provide their local access credentials when a different node is selected to process a check-in request or an upload request for a checked-out file having a file handle that is held by another node. In this way, the node selected to process the check-in request or upload request will have the local access credentials needed to overwrite the stored file at the file share with the uploaded file and/or reacquire the file handle for the checked-out file if necessary.

Figure 9:
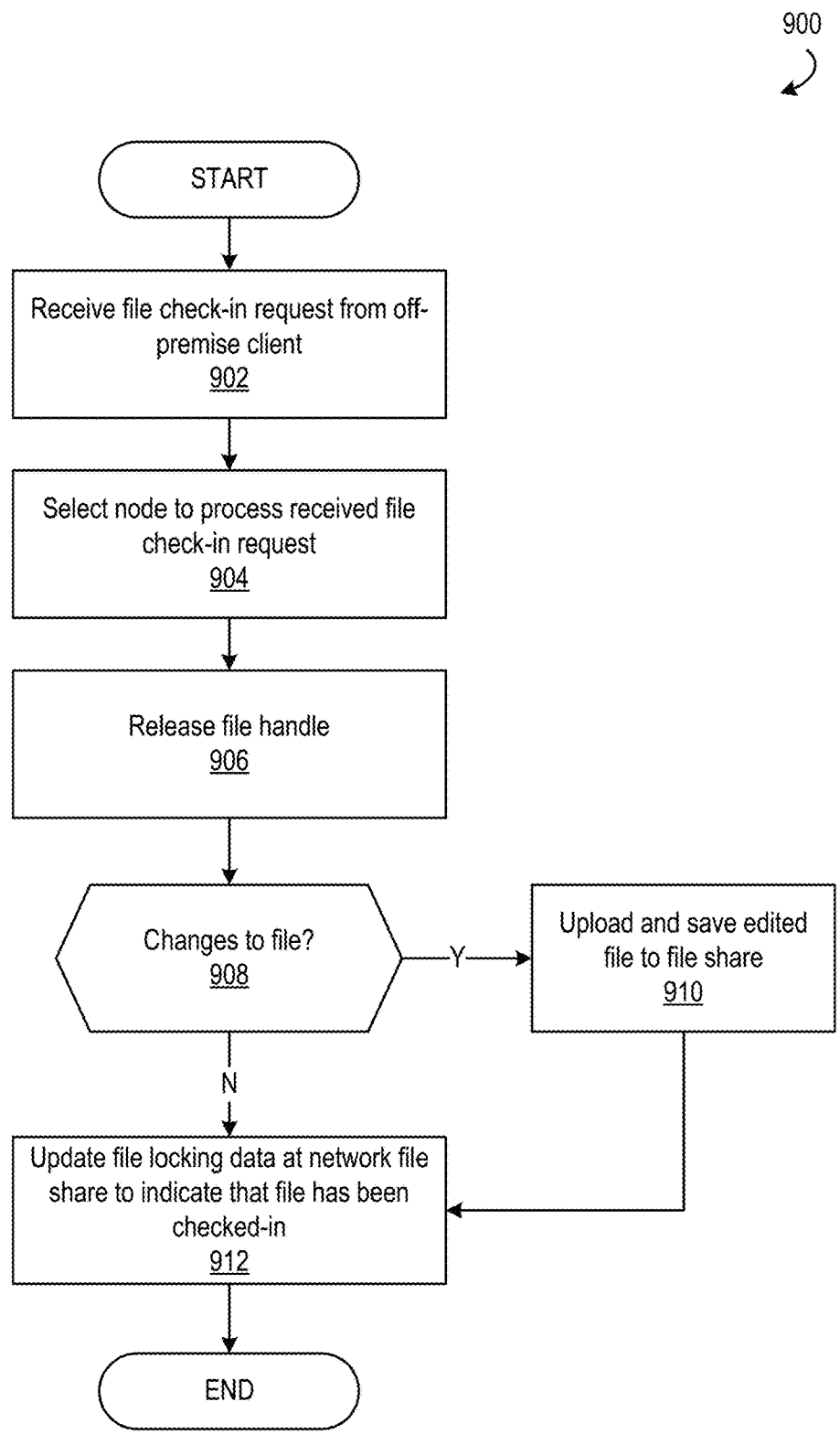
FIG. 9 depicts an illustrative flowchart of example steps for file check-in in a distributed file locking system in accordance with one or more illustrative aspects described herein.

Referring now to FIG. 9, a flowchart 900 of example method steps for checking-in a checked-out file using a distributed file locking architecture as described herein are shown. Checking-in a checked-out file may begin with receiving, from the off-premise source that checked-out the file, a file check-in request (step 902). An on-premise file share controller (e.g., file share controller 704 in FIG. 7) may receive the file check-in request. The off-premise source may be a remote device (e.g., remote device 710 in FIG. 7). Having received the file check-in request, a node may be selected to process the received file check-in request (step 904). The node (e.g., node 706 in FIG. 7) may be selected by a load balancer (e.g., load balancer 716 in FIG. 7) of the file share controller. As explained above, the node selected to process the file check-in request may be different than the node that holds the file handle for the checked-out file. FIG.

Figure 11:
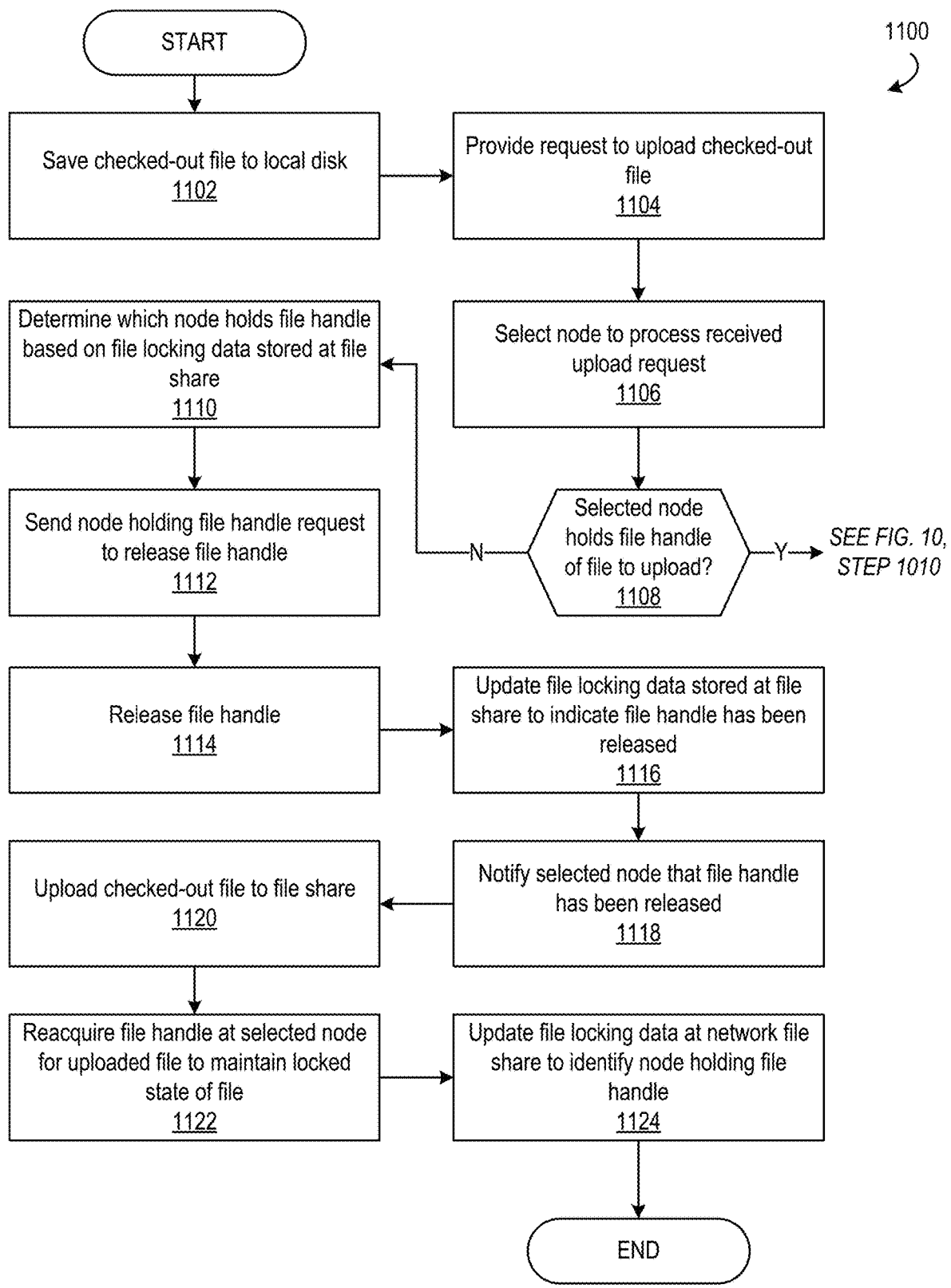
FIG. 11 depicts an additional illustrative flowchart of example steps for uploading a checked-out file in a distributed file locking system in accordance with one or more illustrative aspects described herein.

10 illustrates example method steps for checking-in a file when the node selected to process the file check-in request is also the node that holds the file handle of the file to check-in. FIG. 11 illustrates example method steps for checking-in a file when the node selected to process the file check-in request is different than the node that holds the file handle of the file to check-in.

Continuing with reference to FIG. 9, the file handle for a checked-out file may need to be released before the checked-out file can be uploaded and saved to the network file share. Accordingly, after receiving the check-in request, the file handle of the checked-out file may be released (step 906). As noted above, the node selected to process the check-in request may be different than the node that holds the file handle of the file to check-in. If the selected node does not hold the file handle, then it may determine which node holds the file handle by evaluating the file locking information stored for the file at the network file share and send to that node a request to release the file handle. If the file to check-in has been edited (step 908:Y), then the edited file may be uploaded and saved to the file share (step 910). The file locking data (e.g., file locking data 726 in FIG. 7) stored at the file share (e.g., file share 702 in FIG. 7) may be updated to reflect that the edited file has been checked-in (step 912). If the file to check-in has not been edited (step 908:N), however, then the file locking data stored at the file share may be updated to reflect that the unedited file has been checked-in (step 912). The node that held and released the file handle may perform the update of the file locking data or the node selected to process the check-in request (if different from the node that held the file handle) may perform the update of the file locking data. The node may update the file locking data, e.g., by updating the lock file (e.g., lock file 726A in FIG. 7) that corresponds to the node that held the file handle. The file locking data may be updated to, e.g., delete the information indicating the name of the checked-out file, its file handle, and the other data associated with the recently held file lock. As noted above, the node may utilize its web service to carry out the updates of the file locking data at the file share. As also noted above, the node selected to process the request to upload the checked-out file may not be the same node that holds the file handle of the checked-out file.

Figure 10:
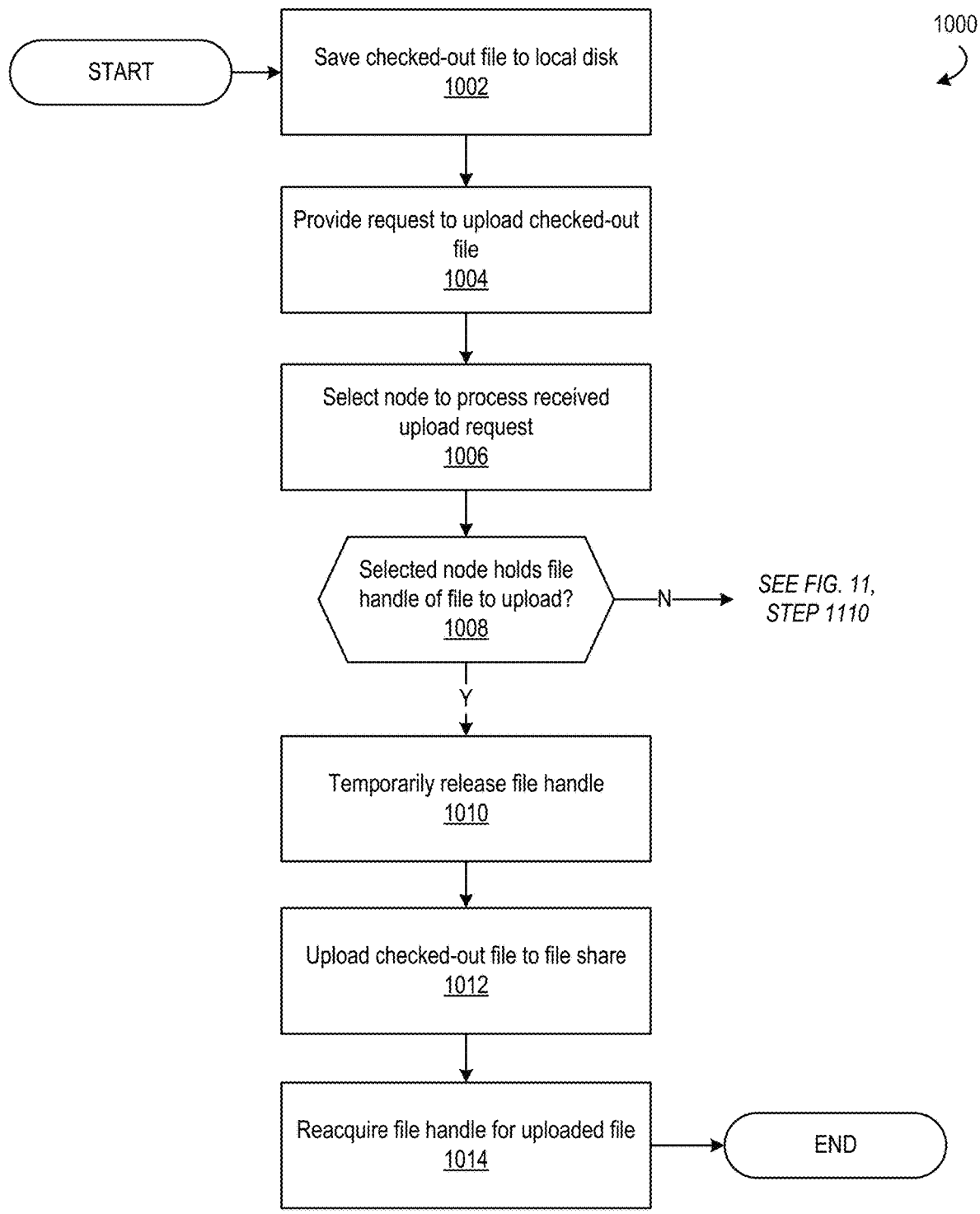
FIG. 10 depicts an illustrative flowchart of example steps for uploading a checked-out file in a distributed file locking system in accordance with one or more illustrative aspects described herein.

In FIG. 10, a flowchart 1000 of example method steps for uploading a checked-out file is shown. In FIG. 10, the node selected to process the upload request is the same as the node that holds the file handle of the checked-out file to upload. The process of uploading a checked-out file may begin with saving the checked-out file to the local disk of the off-premise device (e.g., remote device 710 in FIG. 7) (step 1002). The off-premise device may then provide an upload request to upload the checked-out file to the file share (e.g., file share 702 in FIG. 7) (step 1004). The upload request may be received by the file share controller (e.g., file share controller 704 in FIG. 7) which may select a node (e.g., node 706A in FIG. 7) to process the received upload request (step 1006). FIG. 11 illustrates example method steps for processing an upload request when the node selected to process the upload request is not the same as the node that holds the file handle of the checked-out file (step 1008:N). If, however, the node selected to process the upload request is the same node that holds the file handle of the checked-out file (step 1008:Y), then the node that holds the file handle may temporarily release the file handle of the checked-out file (step 1010). The off-premise device may then upload the checked-out file to the file share (step 1012) for storage. As noted above, the uploaded file may overwrite the current file stored at the file share. In some example implementation, the file system of the file share may employ a cache to temporarily store uploaded files. Using a cache may mitigate performance issues associated with heavy loads on the file share. Having uploaded the file and successfully stored it at the file share, the node may reacquire the file handle for the uploaded file (step 1014). The node may wait until the file to upload has been successfully saved to the file share before reacquiring the file handle for the file.

In FIG. 11, another flowchart 1100 of example method steps for uploading a checked-out file is shown. In contrast to FIG. 10, in FIG. 11, the node selected to process the upload request is not the same as the node that holds the file handle of the checked-out file to upload. Similar to above, however, the process of uploading a checked-out file may begin with saving the checked-out file to the local disk of the off-premise device (e.g., remote device 710 in FIG. 7) (step 1102). Also similar to above, the off-premise device may then provide an upload request to upload the checked-out file to the file share (e.g., file share 702 in FIG. 7) (step 1104). The upload request may likewise be received by the file share controller (e.g., file share controller 704 in FIG. 7) which may select a node (e.g., node 706B in FIG. 7) to process the received upload request (step 1106). The selected node may receive the upload request from the file share controller via its web service (e.g., web service 718 in FIG. 7). As noted, FIG. 10 illustrates example method steps for processing an upload request when the node selected to process the upload request is the same as the node that holds the file handle of the checked-out file (step 1108:N).

If, however, the node selected to process the upload request (e.g., node 706B in FIG. 7) is not the same node that holds the file handle of the checked-out file (e.g., node 706A in FIG. 7) (step 1108:Y), then the node selected to process the upload request may determine which node holds the file handle of the file to upload based on the file locking data (e.g., file locking data 726 in FIG. 7) stored at the file share (step 1010). The selected node may determine which node holds the file handle of the file to upload based on the file path of the file. The upload request that the selected node receives may include the file path. As noted above, the directory (or folder) that stores the file to upload may also store the file locking data as a lock file (e.g., lock file 726A in FIG. 7) that is associated with the node that holds the file handle. As also noted above, the directory may include multiple lock files that each respectively correspond to one of the nodes of the distributed file locking architecture. Accordingly, the selected node may iterate over the lock files stored in the directory that stores the file to upload and evaluate the file locking information they contain in order to determine which node holds the file handle of the file handle to upload.

Having determined which node holds the file handle of the file to upload, the selected node may send, to the node that holds the file handle, a request to release the file handle (step 1112). Upon receipt of the request, the node holding the file handle may release it (step 1114). In FIG. 11, the selected node reacquires the file handle after the file is uploaded. In alternative implementations, however, the node that previously held the file handle may reacquire it. Because the node that previously held the file handle does not reacquire it in this example, the node that released the file handle may update the file locking data stored at the file share to indicate that it has released the file handle (step 1116) as described above. Having released the file handle, the node that previously held the file handle may notify the selected node to indicate that the file handle has been released (step 1118).

The file to upload may then be uploaded from the local disk of the remote off-premise device to the file share for storage (step 1120). As described above, the selected node and the node that previously held the file handle may exchange communications via their respective web services (e.g., web service 718 in FIG. 7). With the file successfully uploaded to the file share, the selected node may reacquire a file handle for the uploaded file in order to maintain its locked state (step 1122). As noted above, in alternative implementations, the node that previously held the file handle may reacquire it instead. Having reacquired the file handle, the selected node may update the file locking data stored at the file share to indicate that it has acquired the file handle for the file (step 1124) as described above.

As noted above, nodes may communicate with each other using a suitable communication protocol (e.g., HTTP). Nodes may likewise communicate with the file share controller using a suitable communication protocol. For example, nodes may exchange communications (e.g., requests to release a file handle, responses indicating release of a file handle) using HTTP requests and HTTP responses that are addressed to the target node using the target node's IP address. The communications may include the path to a file at the file share (the file path), a timestamp, and a hash value. In order to secure the communications pertaining to a file to check-out, check-in, or upload, the file path may be encrypted. The file path may be encrypted using a key known to each of the nodes (e.g., stored in the node's registry). Nodes may use this key to encrypt and decrypt the file path received in communications from another node. The timestamp included in a communication to another node may indicate the date and/or time at which the sending node sent the communication. A receiving node may use the timestamp included in the communication in order to authenticate the communication (e.g., a request to release a file handle). For example, the receiving node may calculate a difference between the time at which the communication was received and the time at which it was sent. If the difference between the sending time and the receiving time is not within a threshold difference (e.g., within x number of seconds or milliseconds), then the receiving node may discard or otherwise ignore the received communication. A receiving node may also use the hash value included in the communication in order to authenticate the communication. For example, the sending node may compute a hash value using (at least) the timestamp and include the hash value in the communication. The sending node may also compute the hash value using the file path. The receiving node may similarly calculate a hash value based on the timestamp and/or file path (e.g., after decryption) included in the received communication. If the hash value calculated by the receiving node matches the hash value received in the communication, then the receiving node may determine the communication is authentic. It will thus be appreciated from the above disclosures that the sending and receiving nodes may utilize a hash value to ensure the timestamp and/or file path has not been manipulated.

The distributed file locking system described herein may also be configured to identify and address incorrect file locking data. It will be appreciated that a situation might arise that results in the loss of the file handles held by a node of the distributed file locking system. For example, if the file handles are held in the volatile memory of the node, then restarting the node may result in the loss of the node's file handles. Restarting the node's OS service may also result in the loss of the node's file handles. The file handles held by a node may also be lost if the node shuts down or otherwise goes offline. The file handle information may persist, however, in the file locking data stored at the file share for that node. If the file share includes file locking data that indicates a node holds a particular file handle that node does not actually hold (e.g., if the file handle is lost), then that file locking data may be described as incorrect, inconsistent, or stale.

The distributed file locking system may use its node(s) to determine whether stale file locking data exists at the file share and, if so, address it. For example, a node may execute a background process (e.g., a background thread) that occasionally (e.g., periodically) reviews another node's lock file (e.g., lock file 726A in FIG. 7). The node may confirm whether that other node still holds the file handle(s) of the file(s) indicated in the other node's lock file. If so, then the reviewing node may determine that the other node's lock file is up-to-date. If, however, the reviewing node encounters a file handle in the other node's lock file that is not currently held by the other node, then the reviewing node may determine that the lock file is stale and contains incorrect file locking data. As described in further detail below with reference to FIG. 12, the reviewing node may attempt to acquire a file handle for a file indicated in the lock file undergoing review. If unsuccessful, then the reviewing node may determine that the other node still holds the file handle and that its lock file is up-to-date. If successful, however, the reviewing node may determine that the file handle previously held by the other node has been lost and that its lock file contains stale file locking data.

To address the stale file locking data, the reviewing node may send a communication to the other node requesting that it correct its file locking data and bring its lock file up-to-date, e.g., by removing the incorrect file locking data. Alternatively, the reviewing node may correct the other node's file locking data. Addressing stale file locking data may also include automatically checking-in a checked-out file whose file handle has been lost. This is because it may no longer be possible to assert exclusive access to the checked-out file (e.g., if another node has reacquired a file handle for another user after the original file handle was lost). In example implementations, a node may be configured to review the file locking data of every other node of the distributed file locking system, and/or multiple nodes (e.g., each node) of the distributed file locking system may review the file locking data of another node.

A node that is conducting a review of another node's file locking data may employ a grace period before concluding that file locking data is stale. In other words, a reviewing node may wait for a period of time before evaluating whether another node's file locking data is up-to-date. The reviewing node may, for example, use the last modified timestamp included in the other node's lock file to apply the grace period (e.g., within the last x number of hours, minutes, seconds, etc.). If, for example, the reviewing node determines the other node last modified its file locking data within the grace period (e.g., based on the last modified timestamp), then the reviewing node may not proceed with the review of the other node's file locking data. If, however, the reviewing node determines the other node last modified its file locking data outside of the grace period, then the reviewing node may proceed with its review of the other node's file locking data. The grace period may be a configurable parameter at the distributed file locking system. By occasionally reviewing the respective file locking data for the nodes of the distributed file locking system, the file locking data may be kept up-to-date and consistent in the event file handles are lost.

Figure 12:
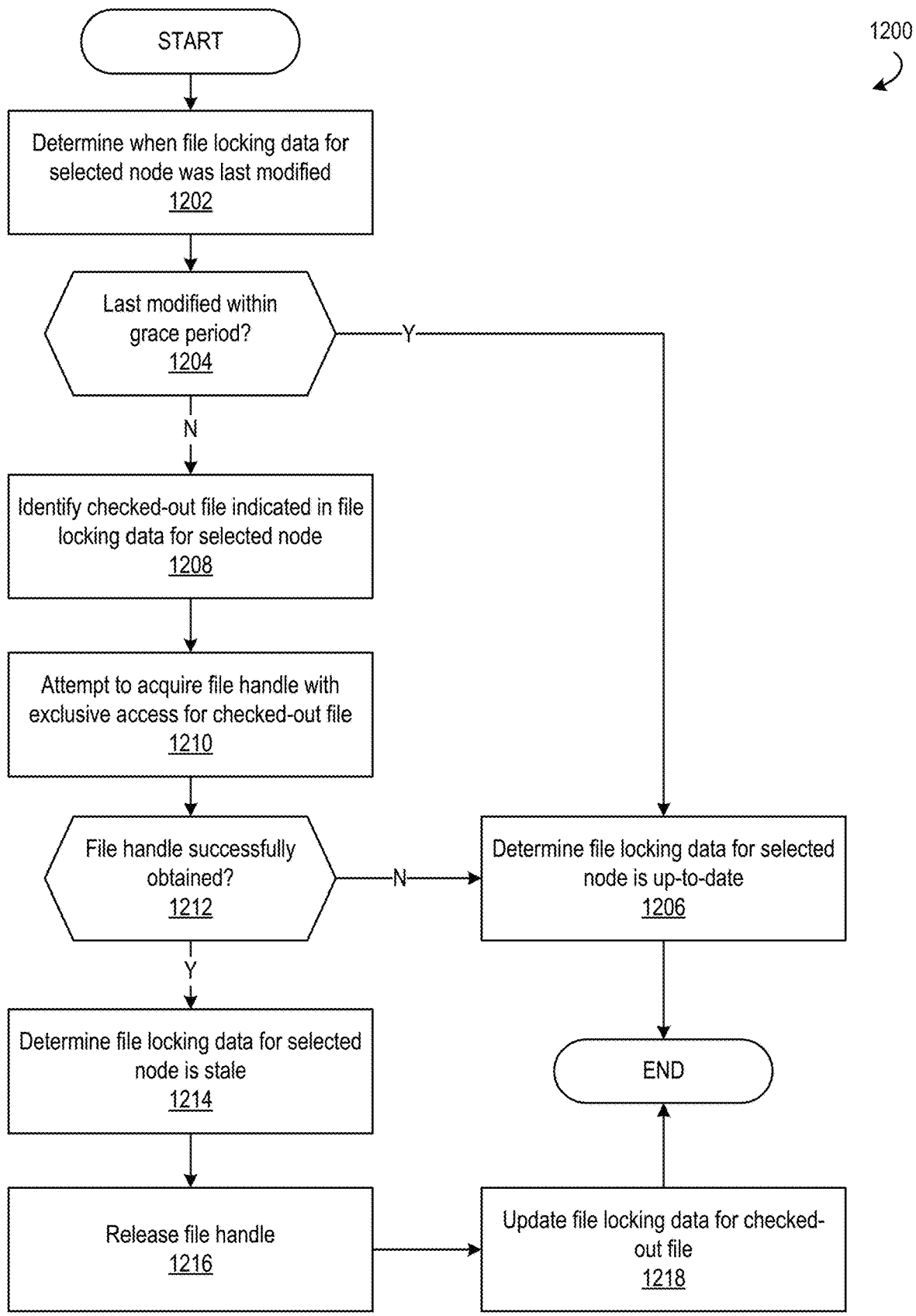
FIG. 12 depicts an illustrative flowchart of example method steps for maintaining consistency in a distributed file locking system in accordance with one or more illustrative aspects described herein.

In FIG. 12, a flowchart 1200 of example method steps for maintaining consistency in a distributed file locking system are shown. A reviewing node (e.g., node 706 in FIG. 7) may begin the review process by selecting a node to review and determining when the selected node's file locking data (e.g., file locking data 726 in FIG. 7) was last modified (step. 1202). If the node determines the file locking data was last modified within the set grace period (step 1204:Y), then the reviewing node may determine that the file locking data for the selected node is up-to-date (step 1206). If, however, the node determines that the selected node's file locking data has not been modified within the grace period (step 1204:N), then the reviewing node may identify a checked-out file that is indicated in the selected node's file locking data (step 1208). The reviewing node may then attempt to acquire a file handle with exclusive access rights for the checked-out file identified (step 1210). If the reviewing node cannot successfully obtain a file handle for the checked-out file (step 1212:N), then the reviewing node may determine that the selected node's file locking data is up-to-date (step 1206). If, however, the reviewing node can successfully obtain a file handle for the checked-out file (step 1212:Y), then the reviewing node may determine that the selected node's file locking data is stale (step 1214) and release the file handle (step 1216). The selected node's file locking data may then be updated (e.g., by the reviewing node or the selected node) to indicate that the checked-out file is not actually checked-out (step 1218), e.g., by removing the file locking information associated with the checked-out file as described above. As noted above, the reviewing node may send a request to the selected node to address its stale file locking data. As also noted above, the selected node's file locking data may be stale because the node has shut down. Accordingly, if the reviewing node does not receive, from the selected node, a response to its request that the selected node address its stale file locking data (e.g., if the selected node is down), then the reviewing node itself may address the selected node's stale file locking data, e.g., by updating the selected node's lock file (e.g., lock file 726A in FIG. 7).

As described above, the file locking data may indicate that multiple files are checked-out, and file locking data may be stored for multiple nodes of the distributed file locking system. Accordingly, a reviewing node may repeat steps 1208-1212 for multiple checked-out files indicated in the file locking data during its review in order to determine whether the file locking data is stale or up-to-date. Similarly, a reviewing node may repeat steps 1202-1204 for multiple nodes of the distributed file locking system in order to determine whether the respective file locking data associated with those nodes is stale or up-to-date. It should also be appreciated that a reviewing node may determine that a selected node's file locking data is stale if it determines that it can successfully acquire a file handle for any of the checked-out files indicated in that file locking data.

Although the subject matter has been described in language specific to structural features and/or methodological acts, it is to be understood that the subject matter defined in the appended claims is not necessarily limited to the specific features or acts described above. For example, the disclosures described herein may be extended to store and share any file-specific information across the nodes that access the file share(s) of the distributed file locking system. The specific features and acts described above are described as example implementations of the following claims.

What is claimed is:

1. A method comprising:
receiving, from a first client within a first network having a first network domain, a request for write access to a file stored at a file share within a second network having a second network domain, wherein the file is locally accessible to a second client within the second network;
preventing the second client from writing to the file at least by:
obtaining, for the file at an addressable node of a plurality of addressable nodes within the second network and separate from the file share, a file handle with exclusive write access to the file; and
holding, at the addressable node and separate from the file share, the file handle obtained;
indicating that the file is in a locked state at least by storing, at the file share, file locking information that indicates the addressable node that holds the file handle for the file;
receiving, from the first client, a request to save, to the file share, edits to the file;
releasing the file handle held at the addressable node;
saving, at the file share, the edits to the file;
maintaining the locked state of the file at least by:
obtaining, at a second addressable node of the plurality of addressable nodes, a new file handle for the file; and
holding, at the second addressable node, the new file handle obtained.

2. The method of claim 1, wherein the addressable node is selected, based on one or more load balancing criteria and from among the plurality of addressable nodes, to process the request for write access to the file.

3. The method of claim 1, wherein storing the file locking information at the file share comprises storing the file locking information in a file share directory containing the file.

4. The method of claim 1, further comprising:
receiving, from another addressable node of the plurality of addressable nodes, a request to update the file locking information stored at the file share; and
based on receiving the request, updating the file locking information stored at the file share.

5. The method of claim 1, further comprising storing, at the file share and for each addressable node of the plurality of addressable nodes, corresponding file locking information that is respectively associated with the addressable node, wherein the corresponding file locking information indicates one or more file handles held at the addressable node.

6. The method of claim 1, further comprising
updating the file locking information to indicate that the file is not in the locked state.

7. The method of claim 6, further comprising:
receiving, from another addressable node of the plurality of addressable nodes, a request to release the file handle held at the addressable node; and
based on receiving the request, releasing the file handle.

8. The method of claim 1, wherein the second addressable node is different than the addressable node that released the file handle.

9. A system comprising:
a file share within a first network having a first network domain, wherein the file share stores one or more files, and wherein in the file share is accessible to a first client within the first network and is remotely accessible to a second client within a second network having a second network domain;

a plurality of addressable nodes within the first network and separate from the file share, wherein each addressable node of the plurality of addressable nodes is configured to hold at least one file handle respectively corresponding to at least one file of the one or more files;

memory storing instructions that, when executed by one or more processors of the system, cause the system to:
receive, from the second client, a request for write access to a file of the one or more files stored at the file share;
prevent the first client from writing to the file at least by:
causing an addressable node of the plurality of addressable nodes to obtain, for the file and separate from the file share, a file handle with exclusive write access to the file; and
causing the addressable node to hold, at the addressable node and separate from the file share, the file handle obtained;
indicate the file is in a locked state at least by storing, at the file share, file locking information that indicates the addressable node that holds the file handle for the file receive, from the second client, a request to save, to the file share, edits to the file;
cause the addressable node that holds the file handle to release the file handle;
cause the file share to save the edits to the file; and
maintain the locked state of the file at least by:
causing a second addressable node of the plurality of addressable nodes to obtain a new file handle for the file; and
causing the second addressable node to hold, at the second addressable node, the new file handle obtained.

10. The system of claim 9, wherein the instructions, when executed by the one or more processors of the system, further cause the system to select, based on one or more load balancing criteria and from among the plurality of addressable nodes, one of the plurality of addressable nodes to process the request for write access to the file.

11. The system of claim 9, wherein the file share stores the file locking information in a file share directory containing the file.

12. The system of claim 9, wherein the file share stores the file locking information in a lock file.

13. The system of claim 9 wherein the file share stores, for each addressable node of the plurality of addressable nodes, corresponding file locking information that is respectively associated with the addressable node, and wherein the corresponding file locking information indicates one or more file handles held at the addressable node.

14. The system of claim 9, wherein the instructions, when executed by the one or more processors of the system, further cause the system to
cause the file locking information to be updated to indicate that the file is no longer in a locked state.

15. The system of claim 14, wherein the instructions, when executed by the one or more processors of the system, further cause the system to cause another addressable node of the plurality of addressable nodes to provide, to the addressable node that holds the file handle, a request to release the file handle.

16. The system of claim 9, wherein the second addressable node is different than the addressable node that released the file handle.

17. A method comprising:
based on receiving, from a first client within a first network having a first network domain, a first request for write access to a file stored at a file share within a second network having a second network domain:
selecting, from among a plurality of addressable nodes within the second network and separate from the file share and based on one or more load balancing criteria, a first addressable node to process the first request;
preventing the a second client with the second network from writing to the file at least by:
obtaining, for the file and at the first addressable node and separate from the file share, a file handle with exclusive write access to the file; and
holding, at the first addressable node and separate from the file share, the file handle obtained;
indicating that the file is in a locked state by storing, in a first lock file that is associated with the first addressable node and that is stored at the file share in a file share directory that contains the file, first file locking information that indicates the first addressable node that holds the file handle for the file; and
based on receiving, from the first client, a second request to save, to the file share, one or more edits to the file:
selecting, from among the plurality of addressable nodes and based on the one or more load balancing criteria, a second addressable node to process the second request;
determining, by the second addressable node and based on the first file locking information of the first lock file, that the first addressable node holds the file handle for the file;
sending, to the first addressable node from the second addressable node, a request to release the file handle;
based on the first addressable node releasing the file handle for the file, updating the first lock file to indicate that the first addressable node no longer holds the file handle;
based on the one or more edits to the file being saved to the file share:
obtaining, for the file and at the second addressable node, a new file handle for the file; and
holding, at the second addressable node, the new file handle obtained; and
maintaining the locked state of the file by storing, in a second lock file associated with the second addressable node and stored at the file share in the file share directory, second file locking information that indicates the second addressable node that holds the new file handle for the file.

18. The method of claim 17, wherein the first file locking information indicates a name of the file, the file handle for the file, and an address of the first addressable node that holds the file handle.

* * * * *